Figure 1:
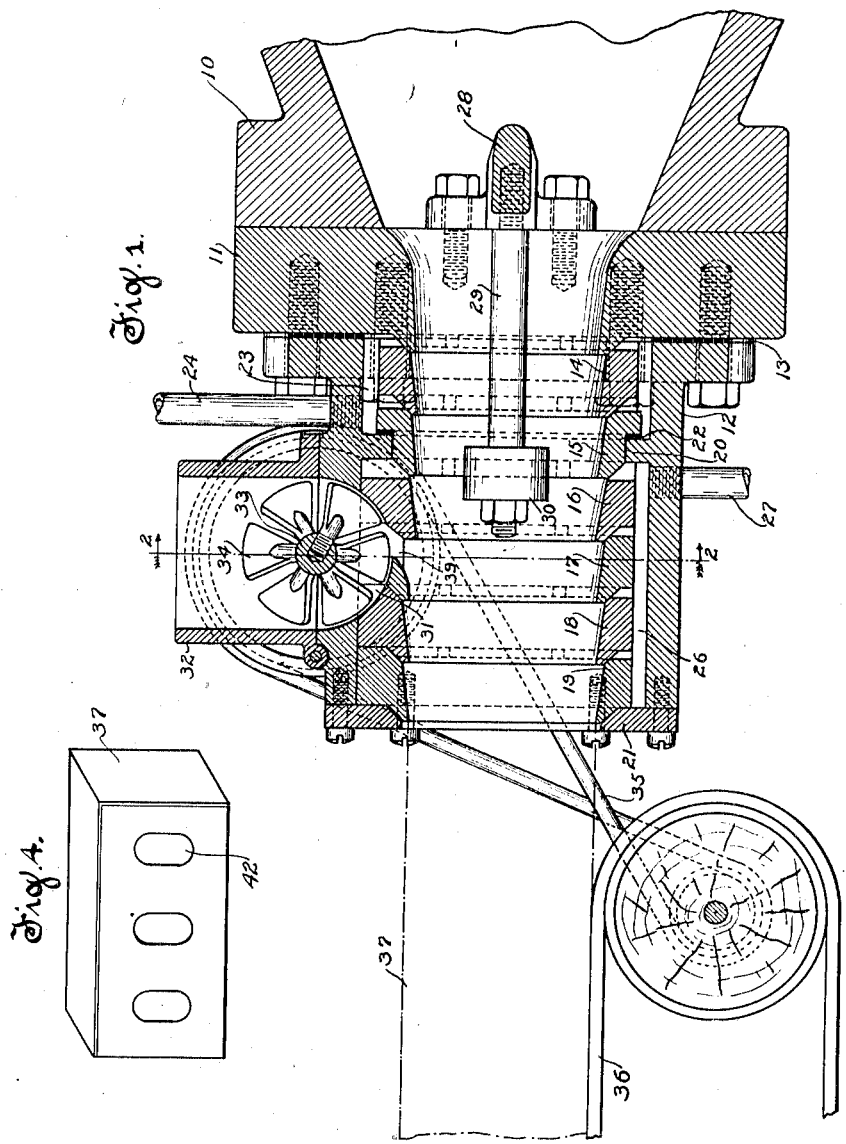

R. T. STULL.
CERAMIC PROCESS AND MACHINE.
APPLICATION FILED SEPT. 21, 1910.

1,096,648.

Patented May 12, 1914.

2 SHEETS—SHEET 1.

Witnesses
John L. Johnson
Chas. L. Byron

Inventor
Ray T. Stull
By Geo. J. Schley
Attorney

R. T. STULL.
CERAMIC PROCESS AND MACHINE.
APPLICATION FILED SEPT. 21, 1910.

1,096,648.

Patented May 12, 1914.
2 SHEETS—SHEET 2.

Witnesses
John L. Johnson
Chas. L. Byron

Inventor
Ray T. Stull
By Geo. F. Schley
Attorney

UNITED STATES PATENT OFFICE.

RAY T. STULL, OF URBANA, ILLINOIS.

CERAMIC PROCESS AND MACHINE.

1,096,648.      Specification of Letters Patent.      Patented May 12, 1914.

Application filed September 21, 1910. Serial No. 582,966.

*To all whom it may concern:*

Be it known that I, RAY T. STULL, a citizen of the United States, residing at Urbana, in the county of Champaign and State of Illinois, have invented new and useful Improvements in Ceramic Processes and Machines, of which the following is a specification.

My invention relates to ceramic processes and machines, and particularly to those for forming columns of clay or other plastic material.

In the manufacture of brick or tile, the clay or other plastic material used, properly tempered, is expressed in the form of a column by a suitable machine, such as an auger or a plunger machine, and the column is then cut into suitable lengths. When enameled or veneered brick or tile is required, the slip or engobe for the veneering has been applied either by hand to the individual bricks or tiles after the column has been cut to form them, or automatically after the column has left the column-forming die but before it has been cut to form the bricks or tiles. Either of these processes has necessitated an extra operation after the column has been completely formed exteriorly. Moreover, the result has not always been entirely satisfactory, probably because the engobe was applied to a smooth finished surface.

It is a main object of my present invention to avoid these difficulties. In order to do so, the slip or engobe is applied to the column during the exterior formation thereof. The spreading surface or surfaces for the slip or engobe are curved, and are tangent to the surface of the clay to which the slip is being applied; these tangent curved surfaces are preferably formed on one or more of the scales constituting the column-forming die. The slip or engobe is applied by positive pressure, the pressure device preferably operating at a speed which varies as the speed with which the clay column issues from the die. The pressure device consists of a shaft, preferably horizontal, which carries the slip or engobe transversely to the line of movement of the clay column, at the same time forcing it through slots in a scale or scales to the clay within.

Sometimes the column which is formed is provided with one or more longitudinal holes or openings. In all machines of which I am aware, the front ends of the cores for forming these holes are substantially flush with the front end of the column-forming die, so that the clay is relieved from the pressure caused by the cores at substantially the same time it is relieved from the pressure caused by the die. On account of the elasticity of the clay, which elasticity depends upon its temper and composition, there is a very perceptible swell in the clay column as it issues from the die. To avoid this I make the cores shorter, so that the front end of the die is considerably in advance of the front end of the cores. Thus the pressure on the column due to the cores is relieved before that due to the die, and the elastic swelling of the clay column is taken up by expansion inward into the holes formed by the cores before the clay column passes from the end of the die.

The various novel features of my invention may be used separately or in combination; they will appear from the description and drawings and will be particularly pointed out in the claims.

Figure 2:
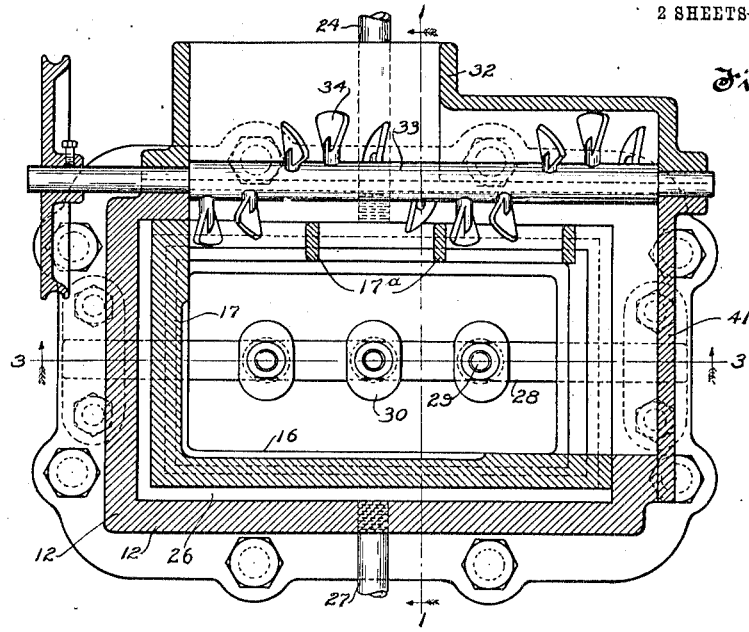
Figure 3:
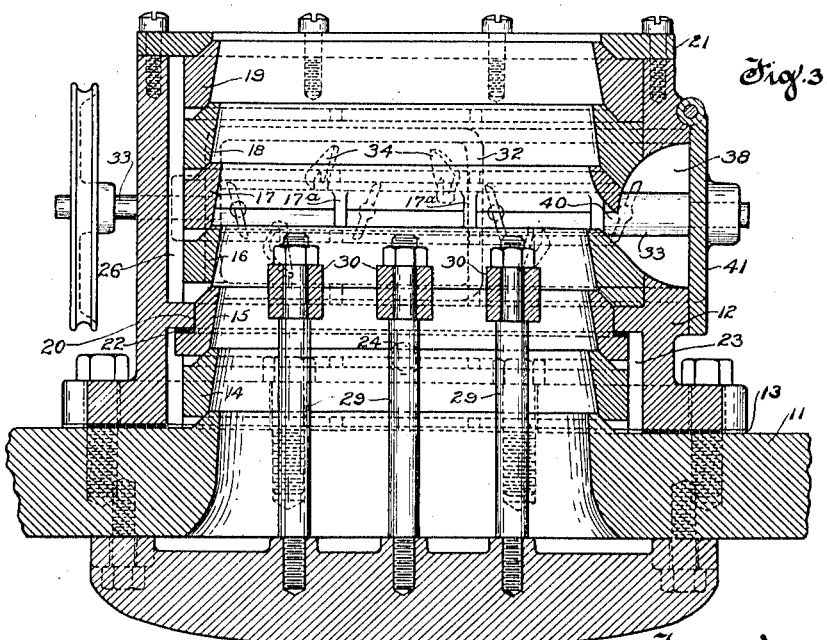

In the drawings, which illustrate the preferred form of my invention, combining all its novel features, Figure 1 is a longitudinal vertical section, substantially on the line 1—1 of Fig. 2, through an expressing machine die embodying my invention, some of the adjacent parts also being shown; Fig. 2 is a section on the line 2—2 of Fig. 1; Fig. 3 is a section on the line 3—3 of Fig. 2; and Fig. 4 shows a finished brick.

At the front end of the barrel or cone 10 of a suitable expressing device, such as an auger or a plunger machine, is the bolting plate 11, to which is bolted the scale box 12, a suitable gasket 13 being preferably interposed between the scale box 12 and the bolting plate 11 in order to make the joint water-tight. The scale box carries a number of scales 14, 15, 16, 17, 18, and 19, here shown as six in number, though any suitable number may be used. Successive scales have offset forming surfaces; that is, the size of the opening at the entering end of each scale is larger than that at the leaving end of the previous scale. The several scales act successively on the clay column, each successive one bringing the column, which swells slightly on leaving each scale, farther from the form it has when it leaves the cone 10 and nearer to the final desired form; the scale 19 completes the formation of the column. These scales have ribbed interfitting surfaces, the first two scales 14 and 15 being clamped together and between the bolting plate 11 and an internal flange 20 on the scale box, while the remaining scales are clamped together and against the scale 15 and flange 20 by an end plate 21 bolted to the scale box. The joint between the flange 20 and the scale 15 is preferably made water-tight by means of a suitable gasket 22. Surrounding the scales 14 and 15 within the scale box 12 is a chamber 23, to which steam, water, or other lubricating substance is admitted through a pipe 24, this lubricating substance then passing through the interstices between the plate 11 and the ribbed scales 14 and 15 to the interior surfaces of the scales and the clay in contact with them. The lubrication is facilitated by the offset structure of the scales. Any excess of lubricating substance may escape through the interstices between the ribbed scales 15 to 19 inclusive to the chamber 26, whence it escapes through the pipe 27.

Bolted to the rear side of the plate 11 is a bridge 28, from which extend the core rods 29 carrying the cores 30. Any desired number of these cores may be used, three being here shown. The front ends of these cores are shown a little to the rear of the middle of the die, though this exact location is not essential. It is only necessary that the front ends of these cores be at a sufficient distance behind the plane of the front end of the die formed by the scales 14 to 19 to allow the clay to expand inwardly into the holes formed by the cores, thus lessening or totally avoiding the exterior swelling of the clay column as it issues from the die.

Formed in the upper edges of the scales 16, 17, and 18 and the top of the scale box 12 is a horizontal semi-cylindrical cavity 31, above which, and preferably hinged to the scale box, is the hopper 32. The axis of this semi-cylindrical cavity is transverse, and preferably at right angles, to the line of movement of the clay column. A shaft 33, journaled in suitable bearings, extends along this axis and carries a number of blades 34. This shaft is rotated in a clockwise direction, (Fig. 1,) being driven by a suitable belt 35 from one of the rollers of the carrier 36 for the finished clay column 37, said carrier being driven by the forward movement of the clay column resting upon it. Thus the speed of the shaft 33 is directly proportional to the speed with which the clay column 37 leaves the die. The blades 34 force the slip or engobe, which is fed into the mouth of the hopper 32, toward and into a vertical cavity 38 in one side of the scales 16, 17, and 18 and the scale box 12, and also through slots or openings 39 and 40 in the scale 17 from the chambers 31 and 38 respectively to the surface of the clay within the die. The openings 39 and 40 are preferably nearer the front end of the die than are the front ends of the cores 30, so that the pressure due to such cores is relieved before the engobe is applied. Transverse to the opening 39 are one or more baffles 17ª, preferably in line with the scale 17. These baffles prevent the movement of the engobe from being solely lengthwise of the shaft 33 in the chamber 31, and compel some of it to pass through the opening 39 to the interior of the die. The side of the chamber 38 is preferably closed by a hinged door 41. The spreading surfaces of the passages 39 and 40—that is, those on the scale 17, which is thus the spreader—are curved as shown, being preferably substantially cylindrical, and are tangent to the surface of the clay passing through the die, as this construction is found to produce the best results. The chambers 31 and 38 are shown only at two sides of the die, as ordinarily it is only desired that two surfaces of the brick or tile be veneered; however, such chambers can be provided on any or all sides, as desired.

As the clay is forced from the expressing machine, it passes through the bolting plate 11 and the scales 14 to 19 inclusive, finally issuing in the finished column 37, which may be cut into suitable sections. The column 37 is here shown as rectangular, but it may be of any suitable design or shape. As the clay passes through the die constituted by the scales 14 to 19 inclusive, the cores 30 form in it holes 42; and as the front end of the cores 30 are not as far forward as the front end of the die, the clay column has a chance to and does swell inwardly into such openings 42 before the column leaves the die. Thus the column 37, as it emerges from the die, is practically without swelling. The clay column 37 passes from the die on to the carrier 36 and drives such carrier by reason of its frictional engagement therewith, and the carrier in its operation drives the shaft 33 and the blades 34 to force the slip or engobe, which is preferably made of a consistency about half way between what brickmakers call soft mud condition and stiff mud condition, through the openings 39 and 40 to the surface of the clay column in process of formation, and preferably after it has passed the front ends of the cores 30. Thus the rate at which the engobe is supplied to the interior of the die is proportional to the rate at which the column is formed. The scale 17, or spreader, spreads on the slip or engobe, and the scales 17, 18, and 19 complete the formation of the column.

Various modifications in the precise arrangement shown and described may be made without departing from the spirit and scope of my invention, and are intended to be covered by the claims. I also aim to cover the broad features of my invention both separately and in combination.

What I claim as new is:

1. A die for an expressing machine, comprising a plurality of column-forming scales, the forming surfaces of successive scales being offset and one of the scales being provided with an opening or openings through which engobe may be supplied, and means for forcing engobe through said opening or openings.

2. In a ceramic machine, a lubricating die comprising a plurality of contacting column forming scales having offset forming surfaces and also having openings for admitting lubricating fluid, an intermediate one of said scales being provided with an opening or openings for admitting engobe to the interior of the die, and means for forcing engobe through said opening or openings.

3. In a ceramic machine, the combination of column-forming means including a die, and means for supplying engobe to the interior of the die at a rate proportional to the rate at which the column is formed.

4. In a ceramic machine, the combination of column-forming means including a die, and means for applying engobe to the surface of the column formed thereby at a rate which varies as the speed with which the column is formed.

5. In a ceramic machine, the combination of a column-forming die, a device for supplying engobe to the surface of the column formed thereby, and means for operating said device at a speed proportional to the speed at which the formed column issues from the die.

6. In a ceramic machine, a column-forming die provided with a lateral opening or openings, a shaft, paddles on said shaft to force engobe through said openings, and means for operating said shaft at a speed dependent on the speed with which the column issues from the die.

7. In a ceramic machine, a column-forming die having a long transverse opening, a shaft substantially parallel to such opening, paddles on said shaft for forcing engobe along and through said opening, and means for operating said shaft at a speed proportional to the speed with which the column issues from the die.

8. In a ceramic machine, a column-forming die having a long transverse opening, a shaft substantially parallel to such opening, and paddles on said shaft for forcing engobe along and through said opening.

9. In a ceramic machine, an engobe spreader having a narrow transverse opening on a horizontal side, a shaft adjacent to and substantially parallel with said opening, and blades carried by said shaft for forcing engobe both lengthwise of said shaft and through said opening.

10. In a ceramic machine, an engobe spreader having a narrow transverse opening, a shaft adjacent to and substantially parallel with said opening, and blades carried by said shaft for forcing engobe both lengthwise of said shaft and through said opening.

11. In a ceramic machine, the combination of a column-forming die comprising a plurality of offset scales, and a core or cores within said die for forming a hole or holes in the column, one or more of said scales being located farther forward than the front end of said core or cores.

12. In a ceramic machine, the combination of a column-forming die having a lateral opening for the admission of an engobe, and a core or cores within said die for forming a hole or holes in the column, the front ends of the core or cores being farther back in the die than the opening for the admission of engobe.

13. The method of forming a veneered column of plastic material, which consists in forcing the material through a die and around a core or cores, relieving the outward pressure due to the cores before relieving the inward pressure due to the die, and applying the veneering after the pressure due to the cores has been relieved but before that due to the die has been relieved.

14. The method of forming a veneered column of plastic material, which consists in forcing the material through a die, and applying engobe to the column at a rate which is dependent upon the rate at which the column issues from the die.

15. In a ceramic machine, the combination of a column-forming die having a plurality of offset scales and provided with an opening intermediate between the front ends of two such scales for admitting engobe to the interior of the die, and a core or cores within said die for forming a hole or holes in the column, the front ends of said core or cores being farther rearward in the die than the front end of the scale directly rearward of said opening.

16. In a ceramic machine, the combination of a column-forming die having a plurality of offset scales and provided with an opening intermediate between the front ends of two such scales for admitting engobe to the interior of the die, a core or cores within said die for forming a hole or holes in the column, the front ends of said core or cores being farther rearward in the die than the front end of the scale directly rearward of said opening, and means for supplying engobe to said opening at a rate dependent upon the rate of formation of the column.

In testimony whereof I have hereunto set my hand in presence of two subscribing witnesses.

RAY T. STULL.

Witnesses:
A. V. BLEININGER,
E. T. MONTGOMERY.